US 6,587,205 B2

(12) United States Patent
Goldner et al.

(10) Patent No.: US 6,587,205 B2
(45) Date of Patent: Jul. 1, 2003

(54) INTEGRATED OPTIC GYROSCOPE AND METHOD OF FABRICATION

(75) Inventors: Eric Lee Goldner, Valencia, CA (US); Daniel Eugene Auerbach, Thousand Oaks, CA (US)

(73) Assignee: Litton Systems, INC, Woodland Hills, CA (US)

( * ) Notice: Subject to any disclaimer, the term of this patent is extended or adjusted under 35 U.S.C. 154(b) by 316 days.

(21) Appl. No.: 09/726,099

(22) Filed: Nov. 28, 2000

(65) Prior Publication Data

US 2002/0015154 A1 Feb. 7, 2002

Related U.S. Application Data

(60) Provisional application No. 60/222,102, filed on Jul. 28, 2000.

(51) Int. Cl.[7] .............................................. G01C 19/72
(52) U.S. Cl. ....................................................... 356/465
(58) Field of Search ................................ 356/460, 461, 356/465, 477, 478; 250/227.19, 227.27

(56) References Cited

U.S. PATENT DOCUMENTS

| | | | |
|---|---|---|---|
| 4,035,081 A | | 7/1977 | Sepp et al. |
| 4,265,541 A | | 5/1981 | Leclerc et al. |
| 4,904,863 A | * | 2/1990 | McDearmon .......... 250/227.17 |
| 5,194,917 A | | 3/1993 | Regener |
| 5,363,192 A | | 11/1994 | Diels et al. |
| 5,394,242 A | | 2/1995 | Porter |
| 5,398,256 A | | 3/1995 | Hohimer et al. |
| 5,408,492 A | | 4/1995 | Vossler et al. |
| 5,555,088 A | | 9/1996 | Valette |
| 6,018,390 A | * | 1/2000 | Youmans et al. ........... 356/477 |
| 6,259,089 B1 | * | 7/2001 | Vali et al. .............. 250/231.12 |
| 6,320,992 B1 | * | 11/2001 | Goldner et al. ................ 385/13 |

FOREIGN PATENT DOCUMENTS

| | | |
|---|---|---|
| EP | 0 454 113 | 10/1991 |
| EP | 0 483 993 A3 | 10/1991 |
| EP | 0 483 993 A2 | 10/1991 |
| GB | 2 329 482 | 3/1999 |

* cited by examiner

Primary Examiner—Samuel A. Turner

(57) ABSTRACT

An integrated optic gyro has a multi-level optical coil having a mounting plate, a top substrate, and a bottom substrate, the top substrate being bonded to the mounting plate, the bottom substrate being bonded to the mounting plate. The top substrate has a top waveguide coil. The bottom substrate has a bottom waveguide coil. A coupler has an input port, a first, second and third output port. A first optical fiber couples the top waveguide coil to the bottom waveguide coil. The coils are coupled to have a common rotational sense. A second optical fiber connects the coupler's first output port to the top waveguide coil. A third optical fiber for connects the coupler's second output port to the bottom waveguide coil. A light source couples a light wave into the coupler's first input port. The coupler splits the light wave into substantially equal first and second output waves. The first wave forms a wave with a first rotational sense in the top and bottom waveguides and the second wave does the same in an opposite direction. A modulator means for modulates the phase of the wave with a first rotational sense and the wave with a second rotational sense. A detector means provides a detected electrical signal.

23 Claims, 6 Drawing Sheets

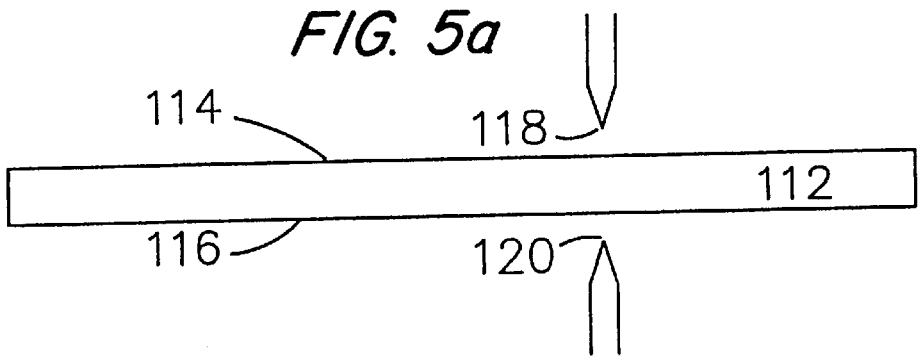
FIG. 5a
FIG. 5b
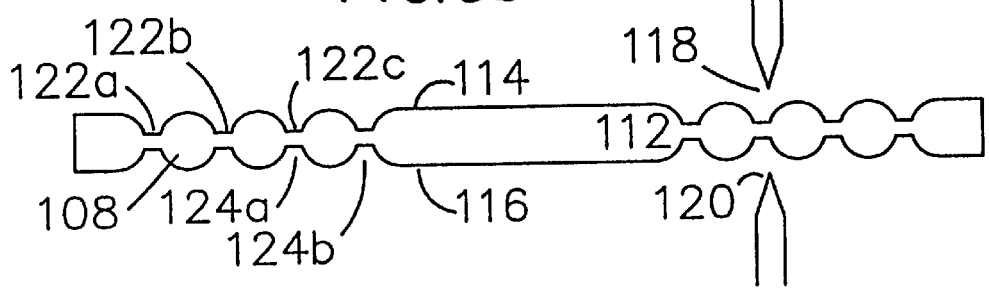
FIG. 5c
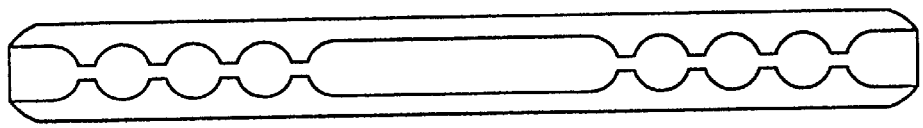
FIG. 5d
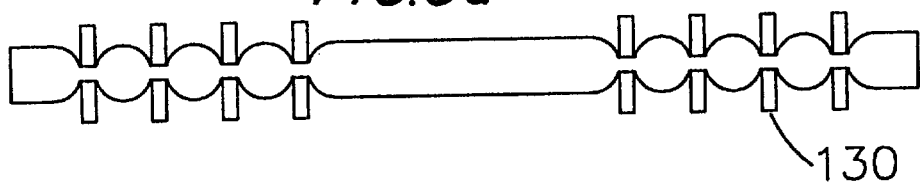
FIG. 5e
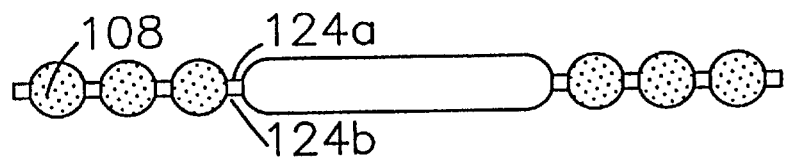
FIG. 5f
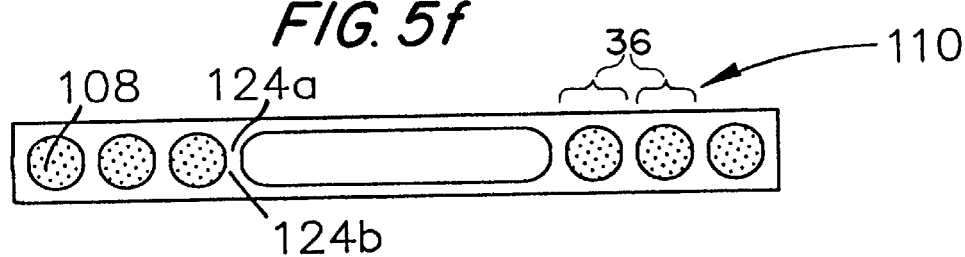

INTEGRATED OPTIC GYROSCOPE AND METHOD OF FABRICATION

BACKGROUND OF THE INVENTION

This non-provisional application is a non-provisional continuation in part of an earlier filed provisional application No. 60/222,102 filed Jul. 28, 2000 and it claims priority therefrom. This application has identical inventors and a common assignee with the previously filed provisional application No. 06/222,102.

FIELD OF THE INVENTION

The present invention relates generally to Sagnac interferometers or more particularly to gyros, which employ optical waveguides, formed on or in the surface of a substrate such crystaline Lithium Niobate or silica glass.

DESCRIPTION OF RELATED ART

Optical rotation sensors, such as RLGS (ring laser gyroscopes) FOGS (fiber optic gyroscopes), IFOGS (interferometric fiber optic gyroscopes), RFOGS (resonant fiber optic gyroscopes) and integrated optic gyros are based on the well-known non-reciprocal optical effect known as the Sagnac effect.

A FOG has a fiber optic coil formed on a coil form. Light from a common source is launched into each end of the coil to form CW (clockwise waves) and CCW (counter-clockwise waves). When the FOG is at rest in inertial space, the CW and CCW waves have the same transit time through the coil. When the two waves are coupled out of the coil and superimposed on a detector, they exhibit a near zero phase difference. When the FOG is rotated around its axis of symmetry, however, the two waves no longer have identical transit times, and will exhibit a phase difference that appears as an interference pattern on the detector, that increases with the rate input to the gyro.

The phase difference, and hence, the output intensity that results, is proportional to the rotation rate, as well as to the area enclosed by the fiber optic coil. Analysis of the output intensity generated by the combined light waves at the photodetector, typically by means input signal modulation and output signal demodulation, provides a precise indication of rate and direction of rotation.

Winding lengths of low-loss optical fiber into a relatively small coil creates a large effective area, making it possible for a compact sensor to resolve very small rotation rates. However, the manufacturing cost of the fiber optic coil component for a FOG gyro is considerable and can the cost can exclude their use from some applications. In addition, output bias stability problems due to varying thermal gradients throughout a coil wound on a bobbin or coil form can limit the FOG's performance. This invention provides an IOG, (integrated optic gyro) and reduces the cost of the waveguide coil for an IOG, further adapting the FOG to mass-production, and provides better thermal control of the coil for enhanced performance. The invention increases the scale factor of an IOG by using at least two substrates, each containing a spiral shaped waveguide.

The area enclosed by the turns within the coil limits the scale factor of an IOG. Integrated optic gyros that use waveguides that are formed on, or in, the surface of a substrate have a sensitivity that is limited by the total area enclosed by the turns of the spiraling waveguide. The area is doubled by the use of a second substrate, and, in addition, a novel method is taught for forming the turns on the substrate.

The spiral coils, formed on the top and bottom substrates, are positioned to be co-axially aligned. The coils are coupled together using one or more optical fiber pigtail connections. The structure of dual substrate coil mounted on opposing sides of a thermally conductive mounting plate is believed to improve the thermal control of the coil over the prior art.

BRIEF DESCRIPTION OF THE DRAWINGS

FIGS. 5a–5f show the steps in one alternative method of making a spiral wave guide.

PREFERRED EMBODIMENT

Figure 1A:
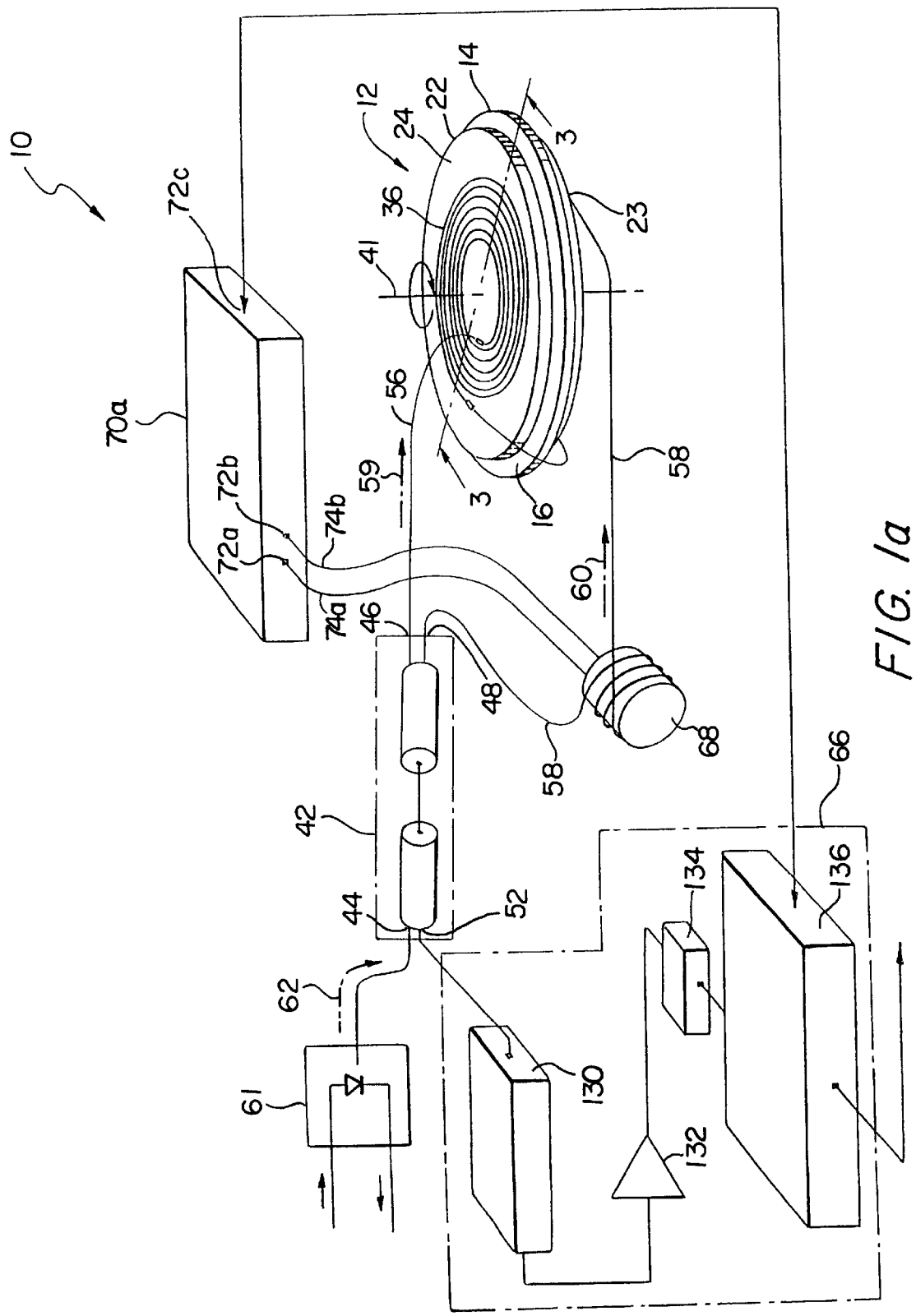
FIG. 1a is a schematic perspective view of the integrated optic gyro using a first and second coupler, PZT modulator and a laser diode as a system.

FIGS. 1a, 1b, 2a and 2b are schematic perspective views showing alternative embodiments of the integrated optic gyro 10 as having a multi-level optical coil 12. FIG. 3, a schematic sectional view of FIG. 1 taken on section line 3—3, more clearly depicts the construction of the multi-level optical coil 12.

The multi-level optical coil 12 is shown having a mounting plate 14. The mounting plate 14 has a top surface 16 and a bottom surface 18. Top substrate 22 and bottom substrate 23 are also shown. The top substrate 22 has a top surface 24 and a bottom surface 26. The top substrate's bottom surface 26 is bonded by an adhesive layer 28 to the mounting plate's top surface 16. Bottom substrate 23 has a top surface 32 and a bottom surface 34. The bottom substrate's top surface 32 is bonded by adhesive layer 33 to the mounting plate's bottom surface 18.

The mounting plate 14 provides both mechanical and thermal stability to the top and bottom substrate and thereby also to the top waveguide coil 36 and the bottom waveguide coil 40. Preferred materials for the mounting plate include those with low coefficients of thermal expansion and high thermal conductivity such as alumna and metal filled ceramics. The mounting plate 14 is manufactured by casting, machining, sintering or other conventional methods. Suitable adhesives include those having a low thermal expansion and low shrinkage, such as glass filled epoxies. Chockfast Orange from ITW Philadelphia Resins, 130 Commerce Drive, Montgomeryville, Pa. 18936, USA is an example of such an adhesive.

The top waveguide coil 36 is shown formed in the top substrate top surface 24. The bottom waveguide coil 40 is shown formed in the second substrate bottom surface 34.

The coils are shown with their respective turns evenly spaced. The sensitive axis of the gyro 41 is shown. The sensitive axis 41 is shown in FIG. 3 as being substantially normal to the plane of the top substrate top surface 24.

Referring to FIG. 1a again, phantom box 42 represents a coupler that typically comprises a first and a second 2×2 fused bi-conical coupler connected as shown. A single 2×2 coupler 42a is used in applications in which an MIOC 78 (Multifunction Integrated Optics Chip) is used, as is shown in FIGS. 2a and 2b.

Coupler 42 can be regarded as a single 2×2 coupler that has an input port 44, a first output port 46, a second output port 48 and a third output port 52. A combination of first and second fused biconical tapered couplers shown in FIGS. 1a and 1b is preferred in high accuracy applications absent an MIOC.

Figure 2A:
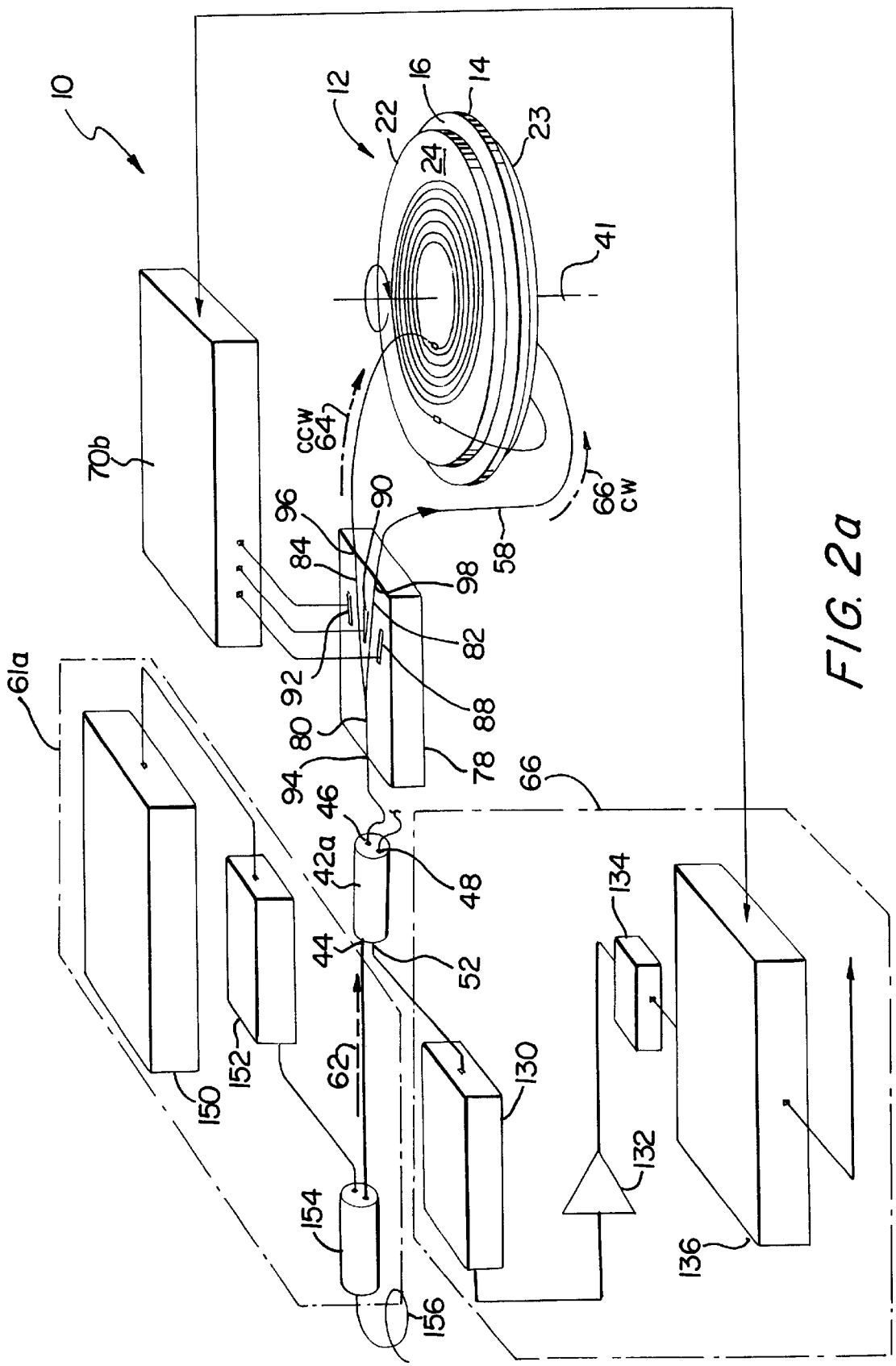
FIG. 2a is a schematic perspective view of the integrated optic gyro using a single coupler, an MIOC and a stabilized fiber light source as a system.
Figure 3:
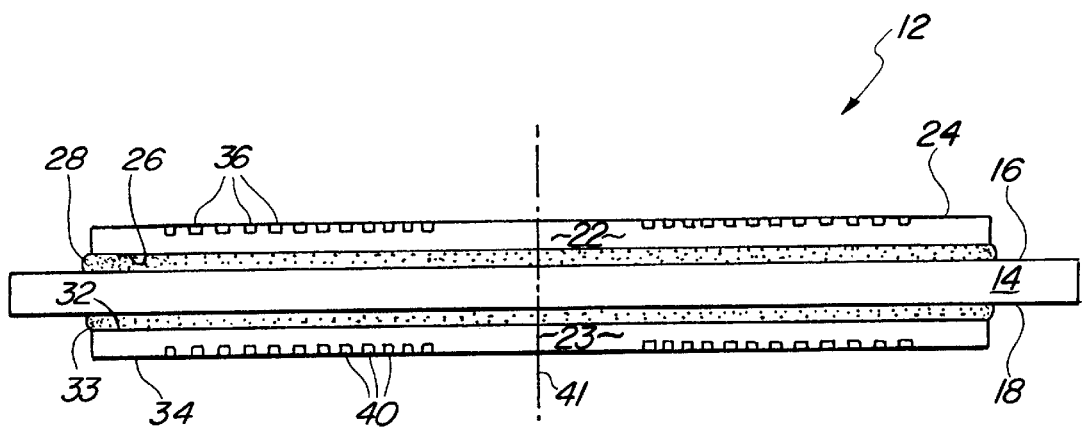
FIG. 3 is a sectional view of the multi-level optical coil taken on line 3—3 in FIG. 1a that schematically shows the thermally conductive mounting plate, and the top and bottom substrates.

Referring to FIG. 2a, fused bi-conical tapered fiber optic couplers, such as 42a are formed from two fibers that are twisted together and fused over a region. As such, the two fibers have four ends with ports 44, 46 and 48 and 52. In the embodiment of FIG. 2a, third port 48 is rendered non-functional, because it is not used. It is made non-functional by coating its end with a high refractive index adhesive or by crushing it or by angle polishing it so that light striking its surface is not reflected back into the fiber.

Figure 2B:
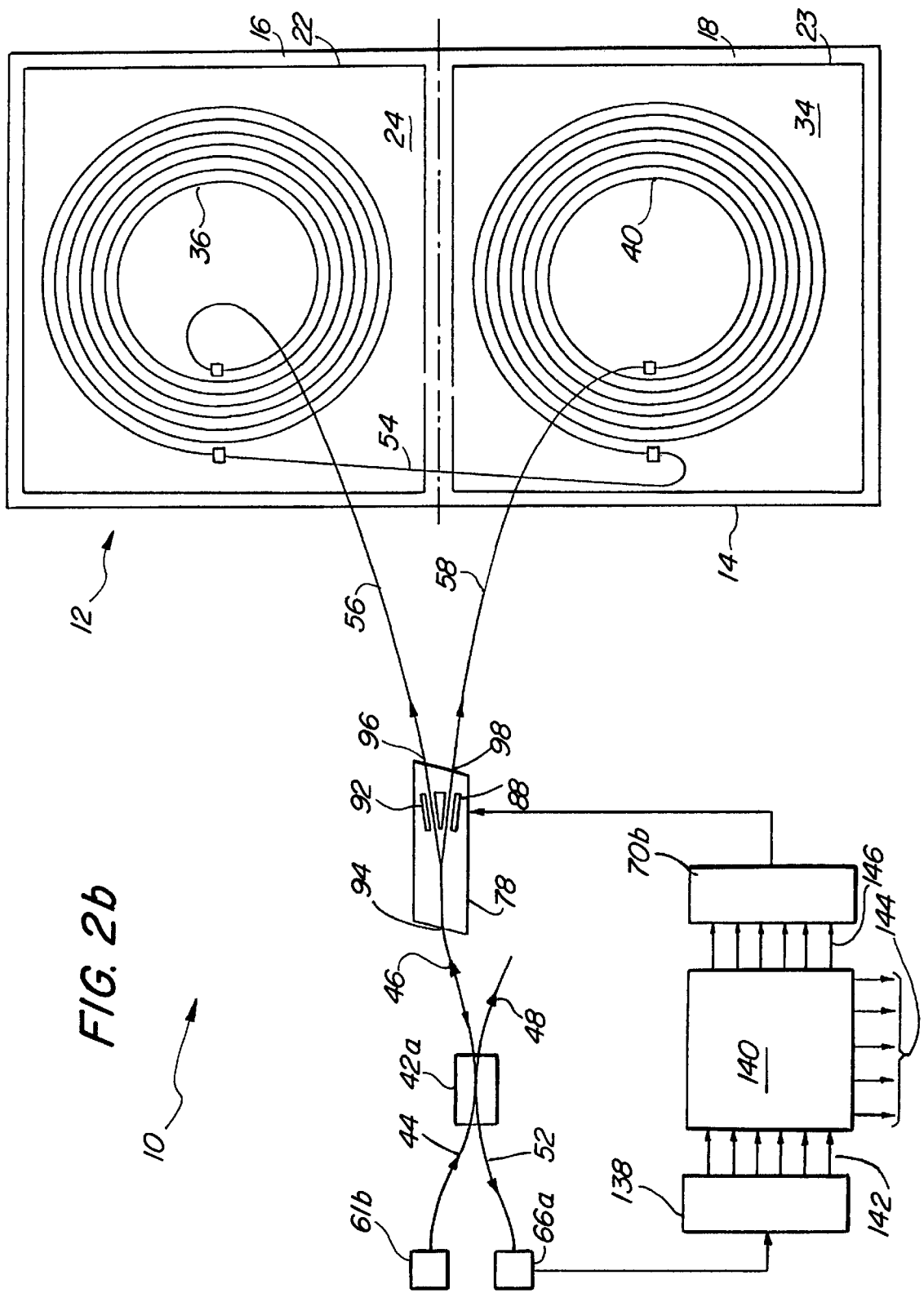
FIG. 2b is a schematic plan view of the top substrate top surface and a bottom substrate bottom surface each having a spiral waveguide formed thereon, the waveguides being coupled to each other and to and to the MIOC.

FIG. 2b shows a first optical fiber 54 coupling the top waveguide coil 36 to the bottom waveguide coil 40. Light passing through the two coils is coupled by the first optical fiber 54 so as to have a common rotational sense. By way of example, if light enters the top waveguide coil 36 from the MIOC 78 first output port 96 via second optical fiber 56, the light wave can be seen to travel in a CCWO (counter-clockwise outward) direction from the top of the gyro looking down. FIG. 2b shows the first optical fiber 54 connecting the outer port of top waveguide coil 36 to the outer port of the second optical fiber 40.

Figure 1B:
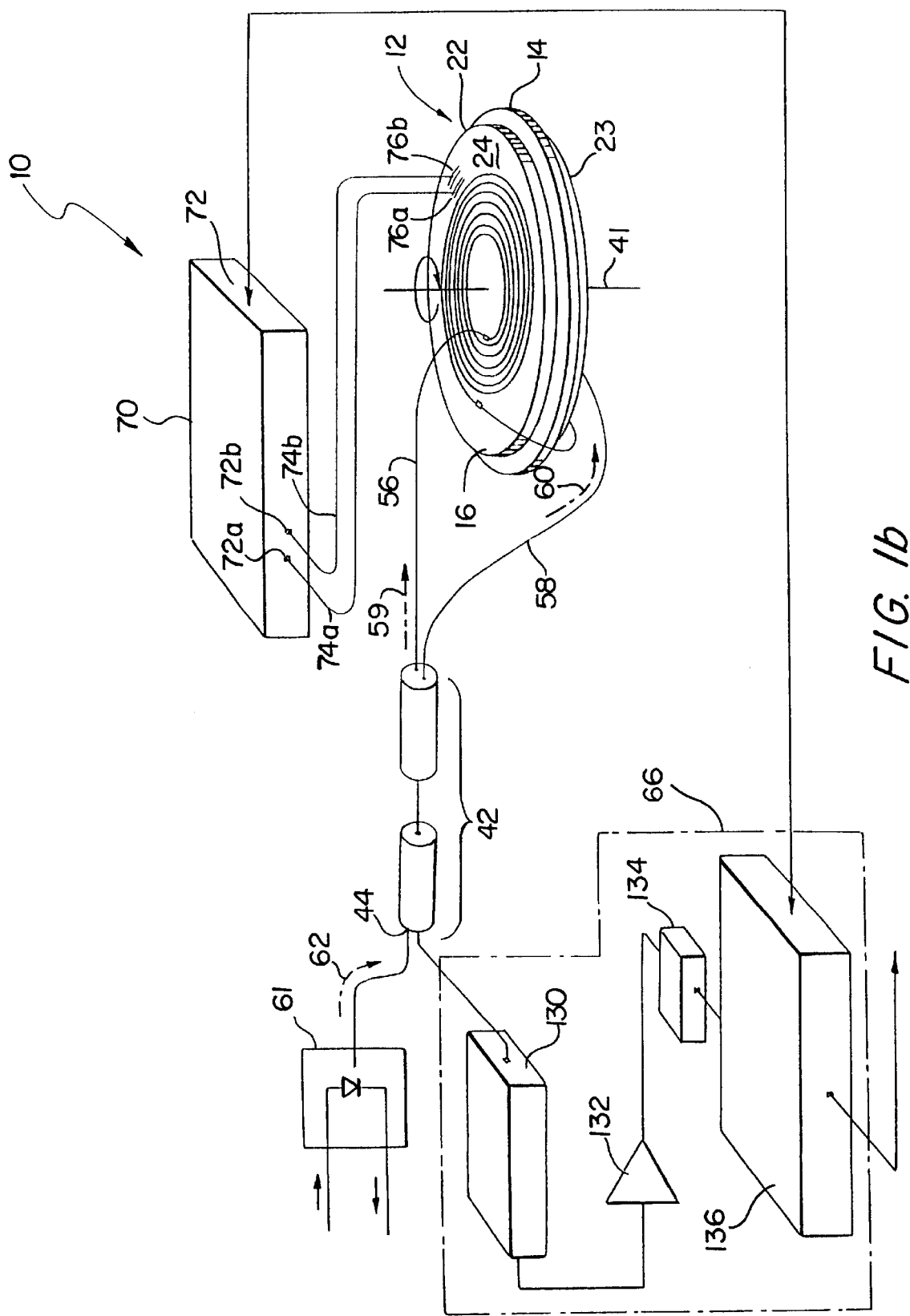
FIG. 1b is a schematic perspective view of the integrated optic gyro using a first and second coupler, a modulator having electrodes astride a waveguide segment.

FIG. 1a provides no information on how the bottom waveguide coil 40 is wound. It might be wound on the bottom surface 34 of the bottom substrate 23 as a CWO (clockwise outward) spiral or as a CCWO (counter-clockwise outward) spiral. Referring again to FIG. 2b, if the top waveguide coil 36 is wound as a CCWO spiral on the top substrate top surface, and the bottom waveguide coil 40 is also wound as a CCWO spiral on the bottom substrate bottom surface, connecting the outer ports of the top waveguide coil and bottom waveguide coil 40, as shown, will obtain a common rotational sense, and also minimize the effect of time-varying thermal gradients across the coil, commonly known as the Shupe effect. The first optical fiber 54 is shown making this connection. Confirmation of the fact that light is moving from the first waveguide coil to the second waveguide coil with a common rotational sense is obtained by assuming a light input from the second optical fiber 56 and tracing its progress from the top waveguide coil to the bottom waveguide coil from a point above the multi-level optical coil 12 when looking down. Light from the second optical fiber 56 is circulating in a CCW direction around the sensitive axis 41 of the gyro 10. Viewed from above, light from the same source is also seen to be moving in the second waveguide coil with a CCW direction.

FIGS. 1a and 1b show the third optical fiber 58 connecting the coupler's second output port 48 to the bottom waveguide coil 40. FIGS. 2a and 2b show the second and third optical fibers 56, 58 delivering CCW and CW waves 59, 60 from the first and second output ports of the MIOC to the inner ports of the top waveguide coil and the bottom waveguide coils respectively.

A light source, represented by box 61, and phantom box 61a, is coupled to provide a light wave represented by phantom line 62 to the coupler's input port 44. The light source 61 is typically a low coherence source selected from the class of light sources comprising solid state ELEDs (Edge emitting Light Emitting Diodes) and SLDs (Super Luminescent Diodes), and sources such as the BFS (Broad Band Fiber Sources) shown in FIG. 2a within phantom box 61a. U.S. Pat. No. 5,313,480 issued May 17, 1994 and U.S. Pat. No. 5,136,600 issued Sep. 18, 1990 both to B. Fideric et al. and having a common assignee teach embodiments of a stabilized superfluorescent source, the contents of which patents are incorporated herein by reference in their entirety.

Referring again to FIG. 1a, the coupler 42 splits light wave 62 into substantially equal first and second (CCW, CW) output waves 59, 60. Coupler 42 combines the two beams coherently to produce an output beam 42, 64 from its third port 52 to.

The top waveguide coil 36 of FIG. 1a as depicted establishes that the first rotational sense is CCW when viewed from above. The coupler outputs the second output wave 60 from its second output port 48 to form to form a wave with a second rotational sense, i.e., CW, in the bottom and top waveguides 40 and 36 respectively that has a rotation rate-dependent intensity. The combination of a single coupler 42 and a MIOC 78, as shown in FIG. 2a, duplicates the function of coupler 42 in FIGS. 1a and 1b of splitting the input light wave 62 into two substantially equal parts and recombining the beams from the coils. Coupler 42 outputs a first output beam 59 from its first output port 46 to form a beam with a first rotational sense, i.e., CCW, in the top and bottom waveguides 36 and 40, respectively.

A piezostrictive cylinder of lead zirconate titanate PZT, 68 is shown wrapped with coils from optical fiber 58. The cylinder 68 represents a first alternative embodiment of an optical phase modulator means when driven by a signal from a phase modulator drive electronics circuit 70a via signals 72a, 72b via signal lines 74a, 74b. It should be understood that the PZT can be connected, as a design choice, in the branch of the second optical fiber 56 or in the branch of the third optical fiber 58 to thereby induce a phase shift in light passing through the second or third optical fibers 56, 58. The diameter of the PZT cylinder changes slightly when a voltage is applied to its terminals. The change in diameter results in a strain on the tightly wound portion of the third optical fiber 58. The strain in the fiber results in a change in the optical path length of the third optical fiber 58, thereby changing the relative phase of the light passing through it. Proper timing of signals 72a, 72b depend on the optical path length of the integrated optic waveguides and the fibers between outputs 46 and 48 ensures application for a non-reciprocal phase shift between the CW and CCW waves for signal processing.

Figure 4:
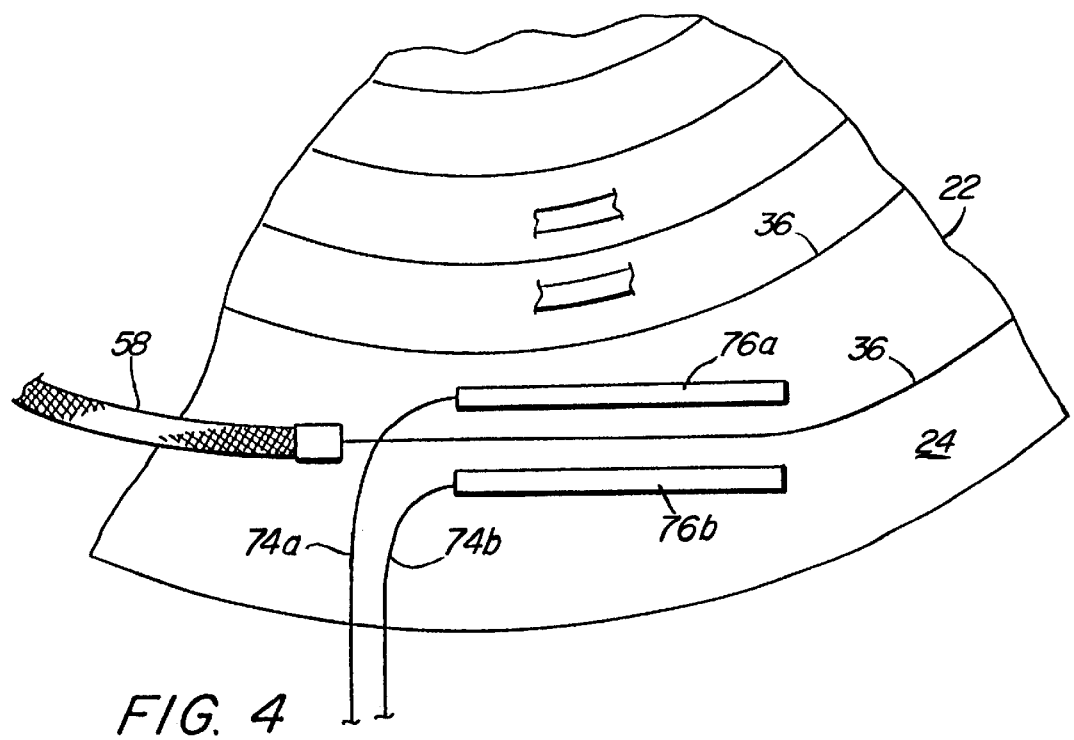
FIG. 4 is a schematic partial plan view of a portion of the outer edge of the top substrate showing a pair of parallel modulator electrodes straddling a segment of waveguide.

FIG. 4 is a schematic broken-away section of FIG. 1b that shows a second alternative embodiment of a modulator means. Conductive electrodes 76a, and 76b are formed on the top surface 24 of the top substrate 22 creating a nearly parallel plate capacitor across wave guide 36. The same conductive electrodes are depicted on FIG. 1b. These conductive electrodes also provide a modulator means for modulating the phase of the first output wave and the second output wave. The conductive electrodes straddle a straight portion of the top optical coil 36. In the alternative, (not shown) a pair of conductive electrodes formed on the bottom substrate 23 closely straddle a straight portion of the bottom waveguide coil 40. The conductive electrodes are electrically driven by phase control signals on signal lines 74a, 74b. Only one of the two modulator means described to this point is used in an application. Signal lines 74a, 74b are either connected to the PZT 68 or to the conductive electrodes 76a, 76b in an application, but not to both.

The embodiment of FIGS. 2a and 2b shows the use of an MIOC (multi-function integrated optics chip) 78 which is formed from a wafer of crystaline Lithium Niobate and processed to have a Y-shaped waveguide junction. The waveguide is formed using a proton exchange method or titanium indiffusion. The Y-shaped junction has an input segment 80, a CW (clock-wise) segment 82 and CCW (counter clockwise) segment 84 straddled by modulator electrodes 88, 90, and 92. The waveguide could also be formed on a silicon wafer by the deposition of germanium doped silica using photo-lithographic methods.

The top and bottom waveguide coils 36 and 40 might also be formed using polymer waveguide structures on silica as an alternative to proton exchange or titanium in diffusion on LiNbO3 waveguides. Polymer waveguides are also suitable and are described in U.S. Pat. Nos. 5,352,556 and 5,136.682. Polymer waveguides are described in connection with a phase modulator in WP 0 402 803 A2. ARROW waveguide structures on silicon are also suitable, and are described in U.S. Pat. No. 5,367,58. The contents of these patents are incorporated herein by reference in their entirety.

The MIOC 78 shown in FIGS. 2a and 2b is a third alternative modulator means for modulating the phase of the wave with a first rotational sense and the wave with a second rotational sense. The "Y" junction has an input port 94, and a first and a second output port 96, 98. At least region of the waveguide between the Y junction input port 94 and output ports 96 and 98 must linearly polarize light. The second optical fiber 56 couples the MIOC first output port 96 to the top waveguide coil 36. The third optical fiber 58 couples the MIOC second output port 98 to the bottom waveguide coil 40. The optical coupler first output port 46 of coupler 42a is coupled the MIOC input port 94. The optical coupler second output port 78 is unused and is treated to eliminate reflections into the gyro. The MIOC modulator electrodes 88, 90, 92 are electrically driven by a phase modulation signal (not shown) from the modulator drive electronics 70b to induce a phase shift in light passing through the second or third optical fibers 56, 58 or both, at any given instant in time. The waveguide is configured to support only the optical polarization state allowed or transmitted by the polarizing portion of the waveguide.

The waveguides on the top and bottom substrates can also be formed as spiral waveguides using the steps of FIGS. 5a–5f. However, other geometric forms may work as well, or better, to accommodate other form factors. As an example, an ellipse of comparable area might be preferable to a pure circular spiral for an application requiring a narrow package. The EPO reference to Vali mentioned above, for example, shows a quasi ellipse. A portion of the waveguide at r near the phase modulator.

A method using laser milling of forming the top and bottom waveguides is discussed in connection with FIGS. 5a–5f. The top waveguide coil 36 and the bottom waveguide coil 40 are each formed separately by first forming a the waveguide core 108 shown in cross-section in FIGS. 5e and 5f, within an optical substrate 110. The method begins by providing a blank optical disc 112, typically of silica glass, as shown in FIG. 5a. The optical blank disk has a top and bottom surface 114, 116. The process of forming waveguide core 108 begins with rotating the optical blank disk 112 about an axis 113, between respective top and bottom laser waves 118 and 120. The laser waves are adjusted in power, aperture and focus. The laser source is guided by a digital program. Digital control is used to control the movement of the laser along a radial of the rotating substrate. The movement is from the outer edge to the center coincident with axis 113, or from the center to the outer edge at a speed adjusted to define opposing paths shown in FIG. 5b as channels 122a, 122b, 122c on the top surface 114 and as 124a, 124b on the bottom surface 116. The waves are focused or masked to cut groves that form the boundaries for the core regions that when coated a material for cladding, will provide a predetermined optical coil waveguide.

The waves are not permitted to cut all of the way through the blank 112. As a result, the optical coils are joined by a continuous web region, shown in section on the top as 122a, 122b, 122c and on the bottom as 124a, 124b. The web regions have a top and bottom surface shown as surfaces 126 and 128 and a depth on the order of 1–10 μm. The top and bottom of the resulting structure of optical webbing is then masked with a coat of photoresist material 130 as shown in FIG. 5c.

Using photolithography, the photoresist adjacent to the web material is removed leaving the core regions 108 exposed as shown in FIG. 5d. As an alternative, to photolithography, a laser could be used to clear a spiral through the mask. The cleared area is centered on the core areas.

The exposed web regions are then doped with a material selected to raise the index of refraction of the region that will be the core region. The protected web region will have a lower index of refraction than that of the core regions 108. The remaining photoresist aterial is then removed leaving the structure characterized by FIG. 5e. This preceding step defines the margins 122a, 124a or boundaries of optical cores 108 that in combination with the web regions 122a, 124a define the waveguides.

Germanium Dioxide could be used as a doping for the web areas to change the index of refraction of silica glass.

FIG. 5e shows the result of chemically removing the mask. The resulting structure should be strong enough to permit handling. The core regions 108 are hatched with dots.

Step 5f shows the result of the final step of cladding the top and bottom surfaces of the guide of optical cores 108 with an optical material having substantially the same index of refraction as that of the web regions 122a, 124a. The result is the formation of the optical substrate 110 containing the waveguide coils 36 therein.

Two optical substrates 110 are then bonded to a thermally conductive ceramic substrate 14 or onto a thermally conductive substrate having a thermal coefficient of expansion selected to closely match that of the optical substrates 110.

As shown in FIG. 2b, a pigtail connection is made from the outer ends of the top waveguide coil 36 and the outer edge of the bottom waveguide coil 40 to make a reciprocal unit. The remaining inner ends of the optical waveguide are connected to the first and second optical fibers 56 and 58.

In yet another alternative embodiment of the invention for a lower accuracy gyro, the bottom substrate 23 of FIGS. 1a, 1b and 2a, the bottom waveguide coil 40 and the first optical fiber 54 are eliminated. In this embodiment, the top waveguide coil is 36 having a core 108 has a first and second port. The second optical fiber 56 connects the first output port of coupler 42 to the top waveguide coil 36 first port within optical substrate 110. The third optical fiber 58 connects the coupler's second output port to the top waveguide coil 36 second port. The top waveguide coil 36 is formed using the method steps characterized above relating to FIGS. 5a though 5f. Moving the lasers along a radial track at constant velocity will produce a coil with a spiral character and with equal distance between coils.

In yet another alternative embodiment, of the integrated optic gyro of FIGS. 1a, 1b, 2a and 2b, the gyro comprises a multilevel optical coil having a top substrate 22, and a bottom substrate 23. The mounting plate 14 is omitted. The first and second substrates are bonded directly to each other. All remaining features of the integrated optic gyro are thereafter, the same, as explained above.

The method or process for making the integrated optic gyro of FIGS. 1a, 1b, 2a or 2b comprises the steps of:

Forming a multi-level optical coil having a mounting plate 14 having a top and bottom surface, a top substrate 22, and a bottom substrate 23. Each substrate has a top and bottom surface. A top spiral waveguide coil is formed in the top substrate and a bottom spiral waveguide coil is formed in the bottom substrate. The top substrate bottom surface is bonded to the mounting plate top surface. The bottom substrate top surface is bonded to the mounting plate bottom surface.

A phase modulator in the form of a fiber-wrapped PZT cylinder or a Multi-Function Integrated Optic Chip.

A coupler 42 is provided. The coupler has an input port and first, second and third output port. A first optical fiber is used to couple the top waveguide coil to the bottom waveguide coil. The coils are coupled so as to have a common rotational sense with respect to the gyro's sensitive axis, which is typically normal to the plane of the top substrate.

A second optical fiber is then used to connect the coupler's first output port to the top waveguide coil. A third optical fiber is then used to connect the coupler's second output port to the bottom waveguide coil. A light source 61, 61a, 61b is then coupled to provide a light wave 62 to the coupler's input port 44.

In the case of the embodiments of FIGS. 1a and 1b, the coupler 42 splits the light wave 62 into substantially equal first and second output waves 59 60. In the case of the embodiment of FIG. 2a, the MIOC 78 linearly polarized light splits the light wave 62 into substantially equal first and second output waves 59, 60. The first output wave 59 is output from the coupler's first output port 46 to form a wave with a first rotational sense in the top and bottom waveguides 36, 40. The second output wave 60 is output from the coupler's second output port 48 to form a wave with a second rotational sense in the bottom and top waveguides. A modulator means, such as PZT 68, electrodes 76a and 76b on substrate 24 or MIOC 78 is coupled to modulate the phase of the wave with a first rotational sense and the wave with a second rotational sense.

A detector means 66 is coupled to receive light from the coupler's third output port 52 and to provide a detected electrical signal. Referring to FIGS. 1a, 1b and 2a, phantom box 66 represents a detector means. The detector means typically comprises a photodetector 130 and preamplifier 132 combination 130. The output signal from the coupler's third output port 52 is directed toward the detector, 66. The detector 130 outputs a detected signal to preamplifier 132, which amplifies and buffers the detected signal. The preamplifier outputs the buffered signal to a low-pass filter 134. The low-pass filter 134 outputs the filtered detected signal to a synchronous demodulator 136. The synchronous demodulator is driven by a reference signal from the phase modulator output 72c to provide a detected output signal. Reference to FIG. 2b sampling electronics 138 samples the value of the detected signal and periodically transfers the signal to a digital computer 140 via buss 142. The computer 140 outputs the processed detected signal as rate information on buss 144 and provides a continuously corrected phase modulation signal to the phase modulation drive electronics 70b on buss 146.

Referring to FIGS. 2a and 2b, block 61b represents the preferred embodiment, utilizing a broadband superfluorescent fiber source. Block 150 represents a pump source control. The output of the pump source control drives a pump diode 152. The pump diode outputs pump light via a WDM 154 (wavelength division multiplexer) to an erbium-doped fiber 156. The erbium-doped fiber provides broadband light over a predetermined band to the WDM 154 which directs the light from the doped fiber to the input port 44 of coupler 42. In the alternative, an SFS (superfluorescent source) may be used. The operation of a superfluorescent source is discussed at length in U.S. Pat. No. 5,136,600 to B. Fidric et al., for a "STABILIZATION APPARATUS AND METHOD FOR AN SFS" which issued on Aug. 4, 1992 and which has a common assignee, the contents of which are incorporated herein by reference in their entirety.

A number of pigtail couplings are shown in the figures. U.S. Pat. No. 5,926,594 issued Jul. 20, 1999 to Ike Song et al., for "SYSTEM AND METHOD FOR ALIGNING AND ATTACHING OPTICAL FIBERS TO OPTICAL WAVEGUIDES AND THE PRODUCTS OBTAINED THEREBY" and U.S. Pat. No. 5,393,371 issued Feb. 28, 1995 to Chin L. Chang et al., for "INTEGRATED OPTICS CHIPS AND LASER ABLATION METHODS FOR ATTACHMENT OF OPTICAL FIBERS THERETO FOR LiNbO3 SUBSTRATES" provide information on connecting fibers to substrates and both have a common assignee with this application. These patents are incorporated herein by reference in their entirety.

Coupling of the first second and third fibers to the waveguides is made possible by trenching, i.e., machining a slot or landing into which contact with polished waveguide port or end is accomplished. Vertical coupling from the surface can also be used, and is discussed in U.S. Pat. No. 5,276,748 for a "VERTICALLY-COUPLED ARROW MODULATORS OR SWITCHES ON SILICON to G. A. Magel and assigned to Texas Instruments Incorporated the contents of which are incorporated herein in their entirety by reference.

Bulk optics coupling onto the surface of an integrated gyro is an alternative fiber-to-waveguide approach and is published in EUROPEAN PATENT APPLICATION 0 483 993 A2 filed by HUGHES AIRCRAFT. The inventor was Victor Vali and the priority document was U.S. Pat. No. 604,265 filed Oct. 29, 1990. The EPO "993" publication also shows a waveguide with a roughly spiral shape. The contents of the EP 0 483 993 A2 reference is incorporated herein by reference in its entirety.

In each of the above embodiments, the different structures of the system are described separately in each of the embodiments. However, those skilled in the art will appreciate that various adaptations and modifications of the preferred embodiment can be configured without departing from the scope and spirit of the invention. For instance, the teachings of the present invention are not intended to be limited to inertial navigation systems of the cruise vehicle type. Where controlled flight is short, is may be possible to eliminate one of the substrates or eliminate the mounting plate 14. The teachings of the present invention can possibly be extended to other applications, which utilize interferometers such as platform stabilization, flight control or robotics. It is to be understood that, within the scope of the appended claims, the invention may be practiced other than as specifically described herein.

What is claimed is:

1. An integrated optic gyro comprising:

a multi-level optical coil having at least a mounting plate having a top and bottom surface, a top substrate, and a bottom substrate, each substrate having a top and bottom surface, the top substrate bottom surface being bonded to the mounting plate top surface and the bottom substrate top surface being bonded to said mounting plate bottom surface, the top substrate having a top waveguide coil, and the bottom substrate having a bottom waveguide coil, the gyro having a sensitive axis substantially normal to the top substrate top surface, a light source providing a light wave, a coupler for splitting the light wave into substantially equal first and second output waves and outputting the first output wave to form a wave with a first rotational sense in the top and bottom waveguides and outputting the second output wave to form a wave with a second rotational sense in the bottom and top waveguides, the waves with a first and a second rotational sense circulating through the top and bottom waveguides and then being returned to said coupler to be coherently combined and output as a coupler output signal;

a modulator means for modulating the phase of the wave with a first rotational sense and the wave with a second rotational sense, a detector means for receiving said coupler output signal and for providing a detected electrical signal.

2. The integrated optic gyro of claim 1 wherein the top waveguide coil formed in the top substrate top surface is configured as a clockwise outward spiral and the bottom waveguide coil formed in the bottom substrate bottom surface is configured as a counter-clockwise outward spiral.

3. The integrated optic gyro of claim 1 wherein the top waveguide coil formed in the top substrate top surface is configured as a counter-clockwise outward spiral and the bottom waveguide coil formed in the bottom substrate bottom surface is configured as a clockwise outward spiral.

4. The integrated optic gyro of claim 1 wherein the top waveguide coil formed in the top substrate top surface is configured as a clockwise outward spiral, and the bottom waveguide coil formed in the bottom substrate bottom surface is configured as a clockwise outward spiral.

5. The integrated optic gyro of claim 1 wherein top waveguide coil formed in the top substrate top surface is configured as a counter-clockwise outward spiral, and the bottom waveguide coil formed in the bottom substrate bottom surface is configured as a counter-clockwise outward spiral.

6. The integrated optic gyro of claim 1 wherein the coupler for splitting the light wave into substantially equal first and second output waves further comprises:

an input port and a first, second and third output port, the light source being coupled to provide the light wave to the coupler's input port, the coupler splitting the light wave into substantially equal intensity first and second parts and coupling the first part to the coupler's first output port and coupling the second part to the coupler's second output port, and wherein the integrated optic gyro further comprises:

a first optical fiber for coupling the top waveguide coil to the bottom waveguide coil, the coils being coupled to have a common rotational sense with respect to the gyro's sensitive axis, a second optical fiber for connecting the coupler's first output port to the top waveguide coil, and a third optical fiber for connecting the coupler's second output port to the bottom waveguide coil, the detector being coupled to receive the coupler output intensity signal from the coupler's third output port.

7. The integrated optic gyro of claim 1 wherein the coupler for splitting the light wave into substantially equal first and second output waves further comprises:

at least a first coupler and a second coupler, the first coupler having a first and second output port, the second coupler having an input port and a first and second output port, the first coupler first output port being coupled to the second coupler input port, the second coupler splitting the light wave into substantially equal first and second parts and coupling the first part to the second coupler's first output port and coupling the second part to the second coupler's second output port, a first optical fiber for coupling the top waveguide coil to the bottom waveguide coil, the coils being coupled to have a common rotational sense with respect to the gyro's sensitive axis, a second optical fiber for connecting the second coupler's first output port to the top waveguide coil, and a third optical fiber for connecting the second coupler's second output port to the bottom waveguide coil, the detector being coupled to receive the coupler output signal from the first coupler's second output port.

8. The integrated optic gyro of claim 1 wherein the modulator means for modulating the phase of the waves having a first rotational sense and the wave having a second rotational sense further comprises a PZT cylinder having a length of the second optical fiber, or a length of the third optical fiber tightly circling the PZT cylinder circumference, the PZT being driven by a phase modulator drive source electrically connected to the PZT cylinder to electrically drive the PZT cylinder to change the diameter of the PZT cylinder to induce strain in the optical fiber circling the PZT cylinder; thereby, inducing a phase shift in light passing through the second or third optical fiber.

9. The integrated optic gyro of claim 1 wherein the modulator means for modulating the phase of the wave with a first rotational sense and the wave with a second rotational sense further comprises an MIOC (multifunction integrated optics chip) having a "Y" junction having an input port, and a first and a second output port, and modulator electrodes, the second optical fiber coupling the MIOC first output port to the top waveguide coil, the third optical fiber coupling the MIOC second output port to the bottom waveguide coil, the MIOC having at least one waveguide portion for polarizing the input wave, the MIOC input port being optically coupled to the optical coupler first output port, the MIOC modulator electrodes being electrically driven to induce phase shifts in light passing through the second and third optical fiber.

10. The integrated optic gyro of claim 1 wherein the modulator means for modulating the phase of the wave with a first rotational sense and the wave with a second rotational sense further comprises:

a pair of conductive electrodes formed on the top substrate to closely straddle a portion of the top waveguide coil or a pair of conductive electrodes formed on the bottom substrate to closely straddle a portion of the bottom waveguide coil, the respective conductive electrodes being electrically driven to induce a phase shift in light passing through the straddled portion of the top waveguide coil or the straddled portion of the bottom waveguide coil by changing the refractive index of the waveguide between the electrodes.

11. The integrated optic gyro of claim 1 wherein the top waveguide coil and the bottom waveguide coil are formed from germanium doped silica glass using photo-lithographic methods.

12. The integrated optic gyro of claim 1 wherein the top waveguide coil and the bottom waveguide coil are formed using a method comprising the steps of:

rotating an optical blank disk of silica having a top and bottom surface between respective top and bottom laser waves, the laser output being adjusted in power, and moved along a radial at a speed adapted to define opposing paths on the top and bottom surface, the waves being focused and masked to form a guide of optical coils, the optical coils being joined by a continuous web region having a top and bottom surface;

masking the top and bottom web surfaces of the guide of optical coils to expose opposing core regions, doping the opposing core regions with germania to produce a core having a higher index of refraction than that of the web regions, the web regions thereby defining the boundaries of optical waveguides, removing the mask and cladding the top and bottom surfaces of the guide of optical coils with an optical material having substantially the same index of refraction as that of the web regions so as to form an optical substrate.

13. The integrated optic gyro of claim 12 wherein the lasers are moved with substantially constant velocity to form a guide of optical coils having a spiral shape.

14. The integrated optic gyro of claim 1 wherein the top substrate and the bottom substrate are each formed from Lithium Niobate or indifused Titanium, and wherein the top waveguide coil is formed in the top substrate top surface and the bottom waveguide coil is formed in the bottom waveguide bottom surface using a proton exchange process to polarize light.

15. The integrated optic gyro of claim 1 wherein the top waveguide coil and the bottom waveguide coil are formed from a polymer material on silica glass using photo-lithographic methods.

16. The integrated optic gyro of claim 1 wherein the light source coupled to provide a light wave to the coupler's input port is a low coherence source selected from the class of light sources comprising ELEDs (Edge emitting Light Emitting Diodes), SLDs (Super Luminescent Diodes), and BFS (Broad Band Fiber Sources) or a high coherence source such as a DFBL (distributed feed band laser).

17. An integrated optic gyro comprising:

a multi-level optical coil having at least a top substrate, and a bottom substrate, the first and second substrates being bonded to each other, the top substrate having a top waveguide coil and the bottom substrate having a bottom waveguide coil, each spiral waveguide having an outer and inner port, means for optically coupling the top waveguide coil to the bottom waveguide coil so as to preserve the rotational sense of light launched into the top or bottom waveguide coil, a coupler having an input port and a first, second and third output port, a first optical fiber for coupling the top waveguide coil to the bottom waveguide coil, the coils being coupled to have a common rotational sense with respect to the gyro's sensitive axis, a second optical fiber for connecting the coupler's first output port to the top waveguide coil, and a third optical fiber for connecting the coupler's second output port to the bottom waveguide coil, a light source coupled to provide a light wave to the coupler's input port, the coupler splitting the light wave into substantially equal first and second output waves and outputting the first wave from its first output port to form a wave with a first rotational sense in the top and bottom waveguides and outputting the second wave from its second output port to form to form a wave with a second rotational sense in the bottom and top waveguides, a modulator means for modulating the phase of the first and second output waves forming the wave with a first rotational sense and the wave with a second rotational sense, a detector means coupled to receive light from the coupler's third output port and for providing a detected electrical signal.

18. The integrated optic gyro of claim 17 wherein the modulator means for modulating the phase of the wave with a first rotational sense and the phase of the wave with a second rotational sense further comprises:

an MIOC (multifunction integrated optics chip) having a "Y" junction having an input port, and a first and a second output port, and modulator electrodes, the second optical fiber coupling the MIOC first output port to the top waveguide coil, the third optical fiber coupling the MIOC second output port to the bottom waveguide coil, the optical coupler first output port being coupled to the MIOC input port, the optical coupler second output port being the coupler's second output port being unused and treated to eliminate reflections into the gyro, the MIOC modulator electrodes being electrically driven to modulate the relative phase between the wave with a first rotational sense and the wave with a second rotational sense.

19. The integrated optic gyro of claim 17 wherein the modulator means for modulating the phase of the wave with a first rotational sense and the wave with a second rotational sense further comprises:

a pair of conductive electrodes formed on the top substrate to closely straddle a portion of the top waveguide coil or a pair of conductive electrodes formed on the bottom substrate to closely straddle a portion of the bottom waveguide coil, the respective conductive electrodes being electrically driven to induce a phase shift in light passing through the straddled portion of the top waveguide coil or the straddled portion of the bottom waveguide coil by changing the refractive index of the waveguide portion between the electrodes.

20. The integrated optic gyro of claim 17 wherein the top waveguide coil and the bottom waveguide coil are formed using a method comprising the steps of:

rotating an optical blank disk having a top and bottom surface between respective top and bottom laser beams, the laser beams being adjusted in power to provide a constant exposure per unit length, and moved along a radial at a speed adapted to define opposing paths on the top and bottom surface, the beams being focused and masked to form a guide of optical coil cores, the optical coils being joined by a continuous web region having a top and bottom surface;

masking the top and bottom web surfaces of the guide of optical coils to expose opposing core regions, doping the opposing core regions to produce a core having a higher index of refraction than that of the web regions, the web regions thereby defining the boundaries of optical waveguides, removing the mask, and cladding the top and bottom surfaces of the guide of optical coils with an optical material having substantially the same index of refraction as that of the web regions so as to form an optical substrate.

21. The method of making a waveguide coil comprising the steps of:

rotating an optical blank disk of optical material having a top and bottom surface between respective top and bottom laser beams, the laser beams being adjusted in power, and moved along a radial at a speed adapted to define opposing paths on the top and bottom surface, the waves beams focused and masked to form a guide of optical coil cores, the optical cores being joined by a continuous web region having a top and bottom surface;

masking the top and bottom web surfaces to expose opposing optical core regions, doping the opposing core regions to produce a core having a higher index of refraction than that of the web regions joining the optical core regions, the web regions thereby defining the boundaries of optical core regions, removing the mask and cladding the top and bottom surfaces of the guide of optical cores with an optical material having substantially the same index of refraction as that of the web regions so as to form an optical substrate.

22. The integrated optic gyro of claim 21 wherein the lasers are moved with substantially constant linear velocity to form a guide of optical coils having a spiral shape, the output power of each laser being continuously adjusted to maintain a constant exposure per unit length.

23. A method for making an integrated optic gyro comprising the steps of:

forming a multi-level optical coil having at least a mounting plate having a top and bottom surface, a top substrate, and a bottom substrate, each substrate having a top and bottom surface, the top substrate bottom surface being bonded to the mounting plate top surface and the bottom substrate top surface being bonded to said mounting plate bottom surface, the top substrate having a top waveguide coil, and the bottom substrate having a bottom waveguide coil, the gyro having a sensitive axis substantially normal to the top substrate top surface, providing a coupler having an input port and a first, second and third output port, using a first optical fiber to couple the top waveguide coil to the bottom waveguide coil, the coils being coupled to have a common rotational sense with respect to the gyro's sensitive axis, using a second optical fiber to connect the coupler's first output port to the top waveguide coil, and using a third optical fiber to connect the coupler's second output port to the bottom waveguide coil, coupling a light source to provide a light wave to the coupler's first input port, the coupler splitting the light wave into substantially equal first and second output waves and outputting the first wave from its first output port to form a wave with a first rotational sense in the top and bottom waveguides and outputting the second wave from its second output port to form to form a wave with a second rotational sense in the bottom and top waveguides, coupling a modulator means to modulate the phase of the wave with a first rotational sense and the wave with a second rotational sense, coupling a detector means to receive light from the coupler's third output port and to providing a detected electrical signal.

* * * * *